United States Patent [19]
Bearzi

[11] 3,977,601
[45] Aug. 31, 1976

[54] SYSTEM FOR RECOVERING SOLAR ENERGY AND ITS DIRECT UTILIZATION

[75] Inventor: Vittorio Bearzi, Azzano X, Italy
[73] Assignee: Sunlife S.p.A., Italy
[22] Filed: Apr. 14, 1975
[21] Appl. No.: 568,088

[52] U.S. Cl. .............................. 237/1 A; 126/271; 237/8 R; 236/91 F
[51] Int. Cl.² ....................... F24J 3/02; F24D 3/00
[58] Field of Search ............ 126/270, 271; 237/1 A, 237/8 R, 66; 236/91 F

[56] References Cited
UNITED STATES PATENTS

| | | | |
|---|---|---|---|
| 2,005,852 | 6/1935 | Broderick | 237/8 |
| 2,469,496 | 5/1949 | Christenson | 126/271 |
| 3,250,269 | 5/1966 | Sherock | 126/271 |
| 3,262,493 | 7/1966 | Hervey | 126/271 |
| 3,299,881 | 1/1967 | Koch | 126/271 |
| 3,822,692 | 6/1974 | Demanest | 126/271 |

*Primary Examiner*—William E. Wayner
*Assistant Examiner*—Henry C. Yuen
*Attorney, Agent, or Firm*—Guido Modiano; Albert Josif

[57] ABSTRACT

System for recovering solar energy, comprising: collector or absorber means for radiant solar energy; a circuit with means for unidirectionally circulating the fluid heated by said collector means, heat exchanger utilization means traversed by said fluid for directly transferring the collected heat to its place of use; and means for preventing circulation when operation of the circulation control means ceases.

2 Claims, 4 Drawing Figures

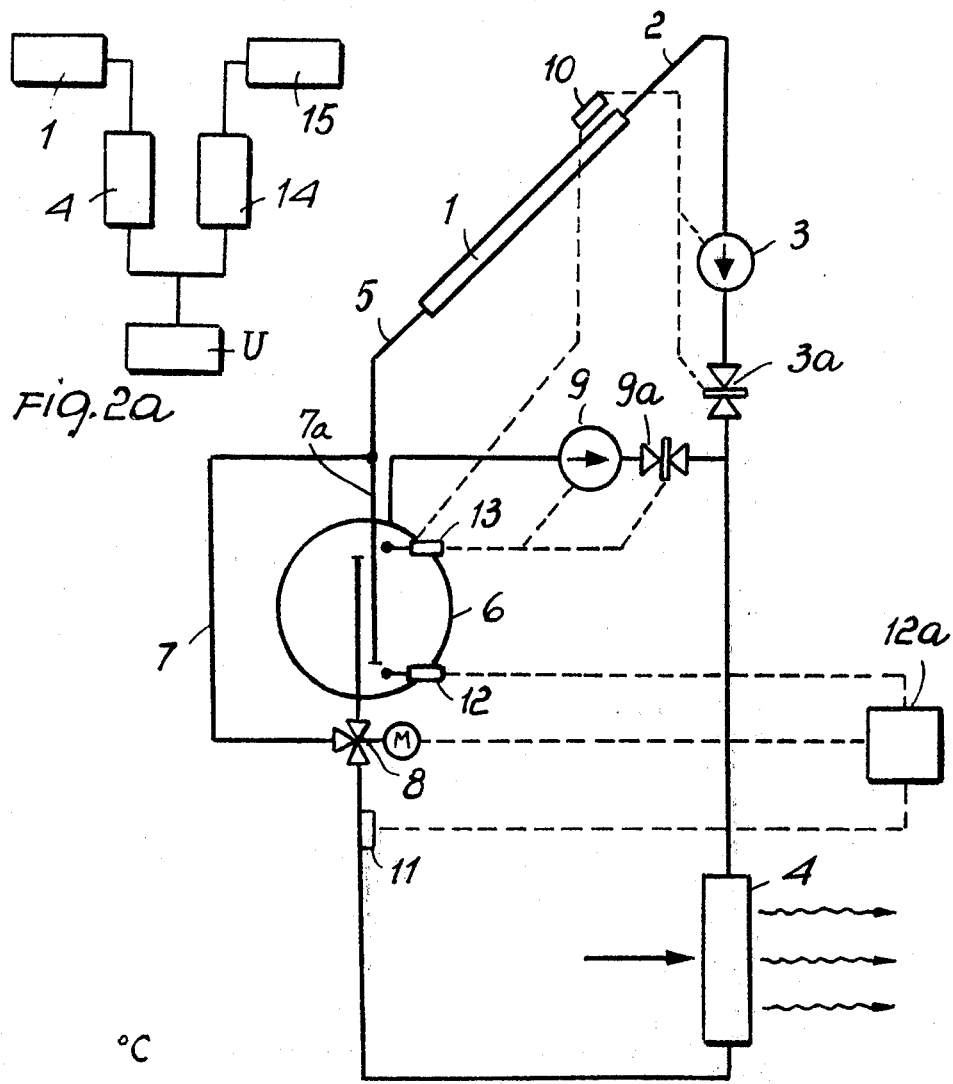
Fig. 2a
Fig. 1
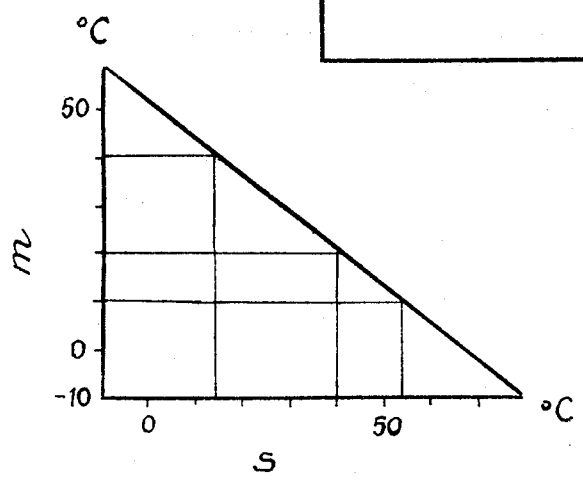
Fig. 3

3,977,601

SYSTEM FOR RECOVERING SOLAR ENERGY AND ITS DIRECT UTILIZATION

BACKGROUND OF THE INVENTION

This invention relates to a system and process for recovering solar energy and its utilisation, particularly but not exclusively for heating installations, for the production of a hot fluid (such as water for consumption) and for other civil and industrial applications wherever preheating, even at low levels, is possible in the course of a thermal process.

The disadvantages inherent in heating systems of the traditional combustion type are known, and the need to utilise other sources of clean energy, in particular solar energy, to obviate these is increasingly felt.

Thermal solar energy systems comprise a collector or absorber arranged to intercept the radiant solar energy and raise the temperature of a working fluid which gives up heat by passing through suitable heat transmission means, such as radiators of central heating installations, heating banks, water heaters, boilers, heat exchangers and the like.

In known systems, this working fluid, heated by an intermediate fluid from the solar collector, is available in storage tanks which are supplemented thermally by a source of traditional heat, and from which the fluid is drawn according to requirements. This indirect system leads to problems of low temperature heat exchange with consequent slowness on starting and heat losses which negatively influence the thermal efficiency of the system.

SUMMARY OF THE INVENTION

The object of the present invention is to provide a direct utilisation solar energy thermal system for a house, which is constructively and operationally simple and operates even when the temperature difference between the end user and the solar heat source is a minimum, with consequent optimum efficiency. A further object of the present invention is to supplement the required services by an auxiliary source of heat of traditional type, operationally separate from the solar energy system. A further object of the present invention is to provide special arrangements which ensure optimum utilisation of the solar energy, under any environmental conditions.

The system for recovering solar energy according to the present invention comprises a collector or absorber of solar energy in a unidirectional flow circuit for the working fluid heated directly by the solar energy and hereinafter called only fluid, shutoff means for excluding the collector in the absence of radiant solar energy, means for directly utilising the heat of the circulating fluid, storage means for the excess heat downstream of said utilising means, means for optimising the storage and means for directly utilising the stored heat.

The system according to the present invention further comprises a traditional source of heat (such as a boiler) which is operationally independent of the operation of the solar energy circuit.

The process for recovering the solar energy for direct utilisation falls within the scope of the present invention, as does the use of an electronic device for the differential temperature control of the fluid, and comprising at least two heat sensitive elements, a unit for processing the signals emitted by the elements, and a control unit operated by the processing unit.

BRIEF DESCRIPTION OF THE DRAWINGS

Further characteristics and advantages of the present invention will be more evident from the detailed description given hereinafter with reference to the accompanying drawings, supplied by way of non-limiting example, in which:

FIG. 1 is a diagrammatic view of a system in accordance with the basic principle of the present invention;

FIG. 2a is a block diagram of a mixed system in which the thermal load is supplied by the solar energy and by a boiler or other traditional heat source;

FIG. 3 is an adjustment curve for the system of FIG. 2b.

The same reference numerals have been used in the figures to indicate corresponding parts.

DESCRIPTION OF PREFERRED EMBODIMENTS

Figure 2B:
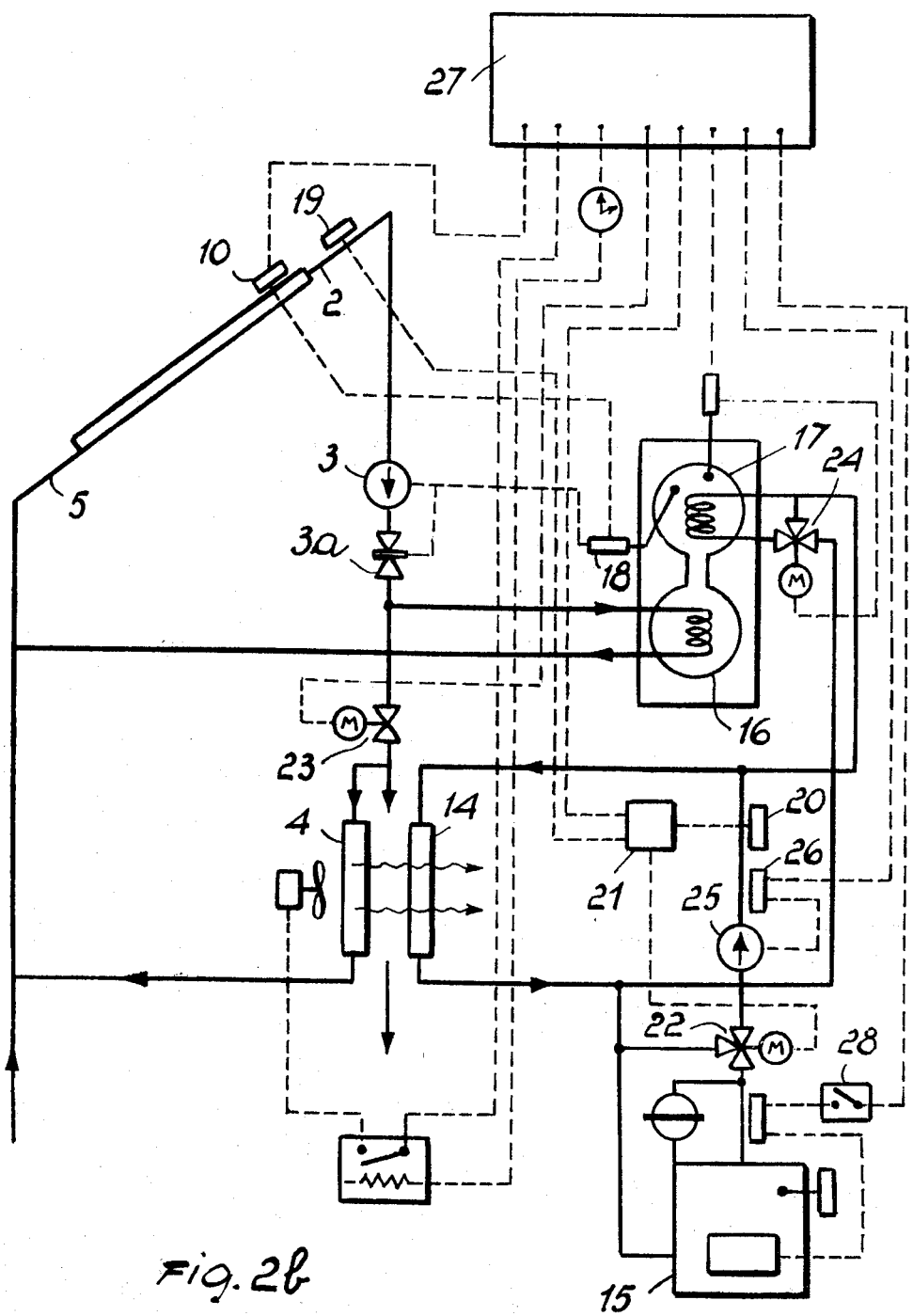
FIG. 2b is an embodiment of the scheme of FIG. 2a for environmental heating and the supply of hot water for consumption.

The system considered in FIG. 1 comprises a radiant solar energy collector or absorber 1 is a solar energy exploiting heating fluid circuit, which, preferably in the form of a tube bundle plate with an inlet pipe and outlet pipe offset on opposite sides with respect to its longitudinal axis and the outlet pipe situated at a higher level than the inlet pipe. The collector 1 heats a fluid, non-freezing if necessary, which by way of a delivery pipe 2 and a pump 3 arrives directly at a user device or heat exchanger utilisation means 4, such as a radiator or a bank of radiators or radiating panels having an input and an output pipe, and then returns through a pipe 5 to the collector 1. A heat storage tank 6 is connected into the fluid circuit downstream of the heating means 4 in parallel with a by-pass pipe 7, by way of a three-way motorised valve 8 sensitive to the temperature of the fluid leaving the heating means 4, which connects in the tank 6 when this latter temperature exceeds a predetermined value and shuts it off when this temperature is lower than said value. A pump 9 feeds hot fluid from the tank 6 to the utilisation means 4. The system is automatically controlled by thermostats 10 and 13 and probes 11 and 12.

It will be appreciated that the thermostats 10, 13 and the probes 11, 12 as well as the differential temperature integrator constitute temperature responsive control means for controlling the pumps 3 and 9 and the setting of the valves 3a and 8.

The operation of the system heretofore described is as follows:

When the thermostat 10 indicates a fluid temperature higher than a given value, the pump 3 is started and the corresponding solenoid valve 3a opened, and the fluid supplies heat to the environment through the means 4. If the temperature of the fluid leaving the means 4 measured by the probe 11 is less than the temperature measured by the probe 12, the motorised valve 8 is positioned by means of the differential temperature integrator 12a so as to return the fluid directly to the collector 1 through the parallel pipe 7. If however the temperature of the fluid leaving the means 4 as measured by 11 is greater than that measured by the probe 12, the differential integrator 12a positions the motorised valve 8 so that the fluid is fed into the top of the storage tank 6 while the collector 1 is fed by the pipe 7a which withdraws cold fluid from the bottom of the storage tank 6.

Thus the storage tank 6 operates only in order to store excess thermal energy, so giving maximum flexibility to the system at the low or variable temperature levels available, and an increase in the overall thermal efficiency of the solar energy intercepting system, as it is possible to feed the panels with low temperature fluid withdrawn from the bottom of the storage tank 6, these characteristics representing an improvement on those of known systems using a storage tank upstream of the utilisation means.

During the night or when the radiant solar energy is otherwise missing, the pump 3 stops under the control of 10, while the pump 9 and the relative solenoid valve 9a start operating under the control of the thermostat 13, and possibly with a predetermined time lag, by which the means 4 are supplied with heat by the fluid stored in the tank 6.

The system heretofore described has been considered only for the purpose of underlining the principle of the present invention. However in practice, and leaving out of consideration special climatic conditions, a system according to the invention can completely satisfy requirements only if used in conjunction with a traditional heating installation which comes into operation when the direct or stored solar radiant energy is insufficient for requirements, by which the overall system leads to considerable economy of fuel, electricity or any other source of energy usually adopted in heating installations.

In the block diagram of FIG. 2a, an end user U, such as an environment to be heated, is supplied by first heat exchanger means 4 fed by the solar energy collector 1 and by second supplementary heat exchanger means 14 fed by a conventional fluid exploiting heater 15. Preferably synchronisation means are provided for starting the supplementary unit (14, 15) with the possible necessary time lag when the main unit (1, 4) becomes insufficient.

A practical fuel energy exploiting system is shown in FIG. 2b, in which the storage tank for the excess heat is not shown in order not to complicate the drawing, but which may be used. In this embodiment the means 4 are associated with means 14, such as a normal radiator traversed by the hot water of a fuel energy exploiting boiler 15. The heat exchanger utilisation means 4 and 14 are operationally separate and independent, but may be enclosed in the same thermoventilator or may consist of radiant panels mounted on a wall or the ceiling and/or in the floor, according to known methods. The solar energy system also feeds a hot water tank 16 coupled to a second hot water tank 17 associated with the boiler 15, a thermostat 18 being provided for protection against superheating of said hot water tanks. The pipes which convey the fluid to the heat exchanger of the hot water tank 16 are sized so as to give precedence to its use in environmental heating. The hot water tank may be connected by known methods to bathroom and/or kitchen radiators, to give better use of the storage in the hot water tank 16 and better comfort conditions without operating costs between seasons. A sensor 19 connected to the delivery pipe 2 of the absorber 1 constitutes the pilot probe having the function if a master pilot probe, and a second sensor 20 constitutes the sub-pilot probe having the function of a sub-master pilot probe of an adjustable control 21 which processes the data supplied by 19 and 20 in accordance with the graph diagrammatically shown in FIG. 3, and acts on a three-way motorised valve 22 associated with the boiler 15 by way of a switch 28. The system is completed by a two-way motorised valve 23 for shutting off the means 4, which can be used for example in summer when the system needs only to supply hot water for consumption; a motorised three-way valve 24 associated with the hot water tank 17; a pump 25 connected in the delivery pipe from the boiler 15 together with its relative thermostat 26; and a control relay unit 27. The thermostats are calibrated so that the radiant solar energy is firstly utilised, and the auxiliary and supplementary boiler 15 comes into operation only when this is absent or insufficient for requirements. The supplementary boiler 15 is always maintained at a temperature (which is subordinated to summer or winter conditions) or preset to exclude the auxiliary system.

It will be appreciated that the sensors 19 and 20 and the respective pilot probes M and S, the thermostat 26 constitute temperature responsive control means having at least one temperature sensitive element 19 responsive to the temperature of the heating fluid of the solar energy exploiting heating system.

The overall operation of the system is considered to be clear to experts of the art from the description given heretofore without going into greater detail.

In fact, the solar energy exploiting circuit system portion of FIG. 2b, operates in a similar manner as the circuit system of FIG. 1, with the peculiarity that the signals of the thermostat 10 are processed by the control unit 27 together with the signals coming from the sensors 19 and 20 in conventional manner in order to put into action the fuel energy exploiting system portion, when the temperature sensed by elements 10 and 19 are lower than a preestablished value. The fuel exploiting circuit system portion is otherwise hydraulically independent from the solar energy exploiting circuit. Since the fuel exploiting circuit system portion is per se not a part of this invention, a more detailed description of operation of this system is omitted.

Obviously within the principle of the invention, the constructional details and embodiments may be widely modified without leaving the scope of the inventive idea.

I claim:

1. A heating system utilizing alternatively solar and fuel energy comprising a first heating fluid circuit exploiting solar energy and a second heating fluid circuit exploiting fuel energy, said first circuit including collector or absorber means for radiant solar energy adapted to heat said heating fluid of said first circuit and having an inlet for the heating fluid to be heated in said collector or absorber means and an outlet for the heating fluid heated therein to be circulated in said first heating fluid circuit, heat exchanger utilization means, said utilization means having an input for the heating fluid and an output therefor, first pipe means directly connecting said outlet of the collector or absorber means with said input of said heat exchanger utilization means, first valve means in said first pipe means for selectively allowing and preventing fluid flow therethrough, a heat storage means, second pipe means connecting the output of said heat exchanger utilisation means with said heat storage means, third pipe means connecting said heat storage means with said inlet of said collector or absorber means, first by-pass pipe means having one end thereof hydraulically connected with said second pipe means at a point situated between said heat exchanger means and said heat storage means, said first by-pass pipe means having another end thereof hydraulically connected with said third pipe means at a point situated between said heat storage means and said inlet of said collector or absorber means, second valve means at said one end of said first by-pass pipe means for selectively allowing and preventing fluid passage through said first by-pass pipe means towards said collector or absorber means and through said second pipe means towards said heat storage means, and second by-pass pipe means having one extremity thereof connected with said heat storage means and having another extremity thereof connected with said first pipe means in a point situated between said first valve means and the input of said heat exchanger means, first pump means in said first pipe means for creating a stream of said heating fluid directed from said collector or absorber means towards said heat exchanger means and therefrom towards said heat storage means and therefrom towards said inlet of said collector or absorber means and alternatively from said heat exchanger means towards said first by-pass pipe means and therefrom towards said inlet of said collector or absorber means via said third pipe means, and first temperature responsive control means for controlling said pump means and the setting of said first and second valve means, said second heating fluid circuit exploiting fuel energy being hydraulically separated from said first heating fluid circuit and having a fuel heated boiler, and own heat exchanger utilisation means, and pump and valve means for circulating the heating fluid, and second temperature responsive control means controlling the operation of the own valve and pump means of said second heating fluid circuit, said second temperature responsive control means having at least one temperature sensitive element responsive to the temperature of the heating fluid of said first heating fluid circuit in at least one point thereof, to put in operation said second heating fluid circuit when the heating fluid of said first heating fluid circuit is below a prestablished value.

2. A system according to claim 1, wherein said second by-pass pipe means includes second pump means for creating a stream of heating fluid from said heat storage means towards said heat exchanger utilisation means and therefrom towards said heat storage means, when said first valve means and said first pump are shut off.

* * * * *